United States Patent [19]
Kitos

[11] Patent Number: 5,505,775
[45] Date of Patent: Apr. 9, 1996

[54] CAKE DECORATING SYSTEM

[76] Inventor: John Kitos, 15561 Producer La., Unit B, Huntington Beach, Calif. 92649

[21] Appl. No.: 129,244

[22] Filed: Sep. 29, 1993

[51] Int. Cl.⁶ .................................................. A23G 3/28
[52] U.S. Cl. .............................. 118/14; 118/13; 118/24; 118/25; 118/211; 118/256; 364/188; 364/468; 395/125; 426/87; 426/104; 426/383
[58] Field of Search .................... 118/13, 14, 23, 118/24, 25, 208, 211, 256; 364/167.01, 474.28, 188, 468; 426/383, 87, 104; 395/125

[56] References Cited

U.S. PATENT DOCUMENTS

| | | | |
|---|---|---|---|
| 3,279,422 | 10/1966 | Landers | 118/25 X |
| 3,427,650 | 2/1969 | Woody | 118/13 X |
| 3,654,894 | 4/1972 | Rohrbacher et al. | 118/24 X |
| 3,751,198 | 8/1973 | Tanara | 118/24 X |
| 3,824,950 | 7/1974 | Woody | 118/14 |
| 4,168,662 | 9/1979 | Fell | 426/383 X |
| 4,278,022 | 7/1981 | Fitzpatrick et al. | 426/383 X |
| 4,285,978 | 8/1981 | Quinlivan | 426/104 X |
| 4,292,917 | 10/1981 | Ezaki | 118/25 X |
| 4,455,320 | 6/1984 | Syrmis | 426/104 X |
| 4,548,825 | 10/1985 | Voss et al. | 118/25 X |
| 4,670,271 | 6/1987 | Pasternak | 426/104 X |
| 4,758,143 | 7/1988 | Lopes | 118/25 X |
| 4,843,958 | 7/1989 | Egosi | 426/383 X |
| 4,910,661 | 3/1990 | Barth et al. | 364/167.01 |
| 5,081,917 | 1/1992 | Masuda | 118/14 X |
| 5,255,352 | 10/1993 | Falk | 395/125 |
| 5,334,404 | 8/1994 | Garcia et al. | 426/87 X |

*Primary Examiner*—Jill Warden
*Assistant Examiner*—Maureen M. Wallenhorst
*Attorney, Agent, or Firm*—Christie, Parker & Hale

[57] ABSTRACT

A cake decoration system employing an integrated work surface having integral cake positioning guides in a first portion of the surface, a flat bed image scanner in a second portion of the surface, and an operator interface with display and entry keys incorporated in a third portion of the work surface provides an efficient self-contained cake decorating station. A motion control system using a traveling arm extending over the work surface to carry a colorant cartridge with a drop on demand colorant expulsion system all under the control of a central processor allows transfer of images obtained on the scanner to the surface of a cake to be decorated by use of a pixel map. Use of a multiple orifice drop on demand colorant expulsion system allows one pass three color printing on the article being decorated.

7 Claims, 7 Drawing Sheets

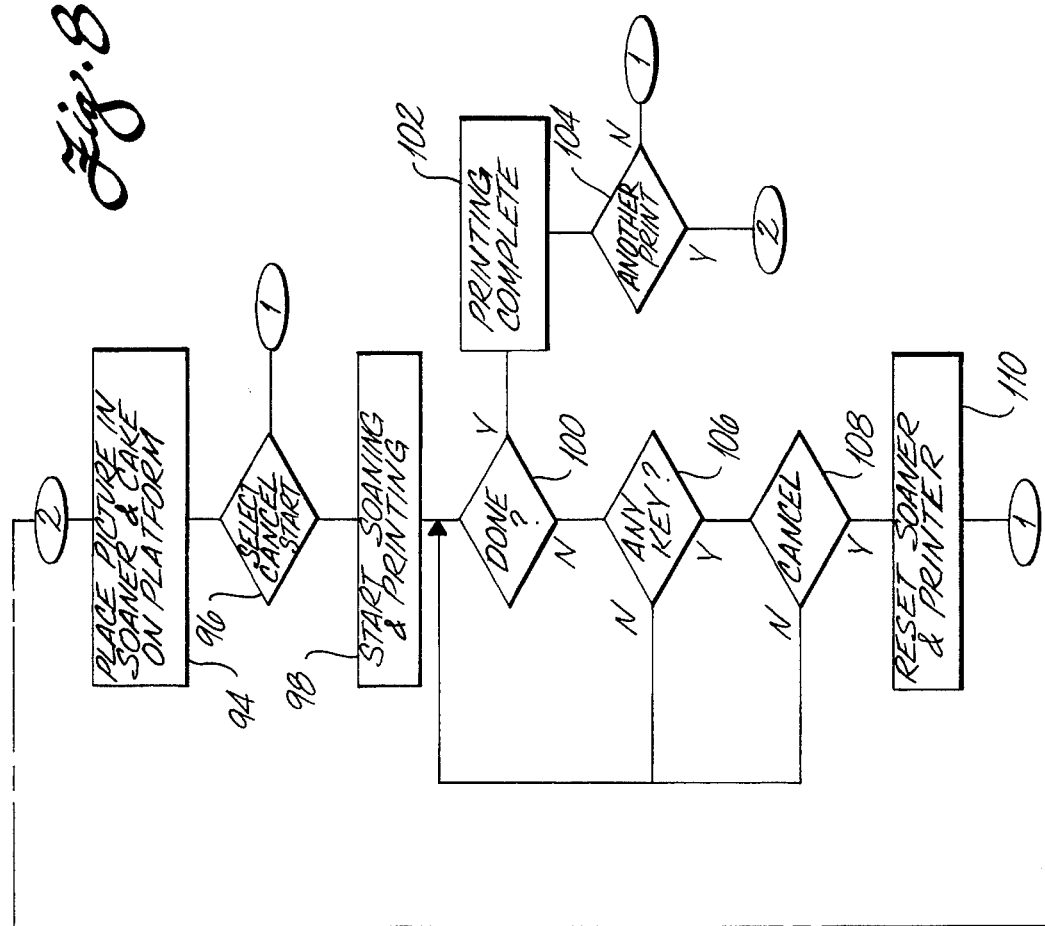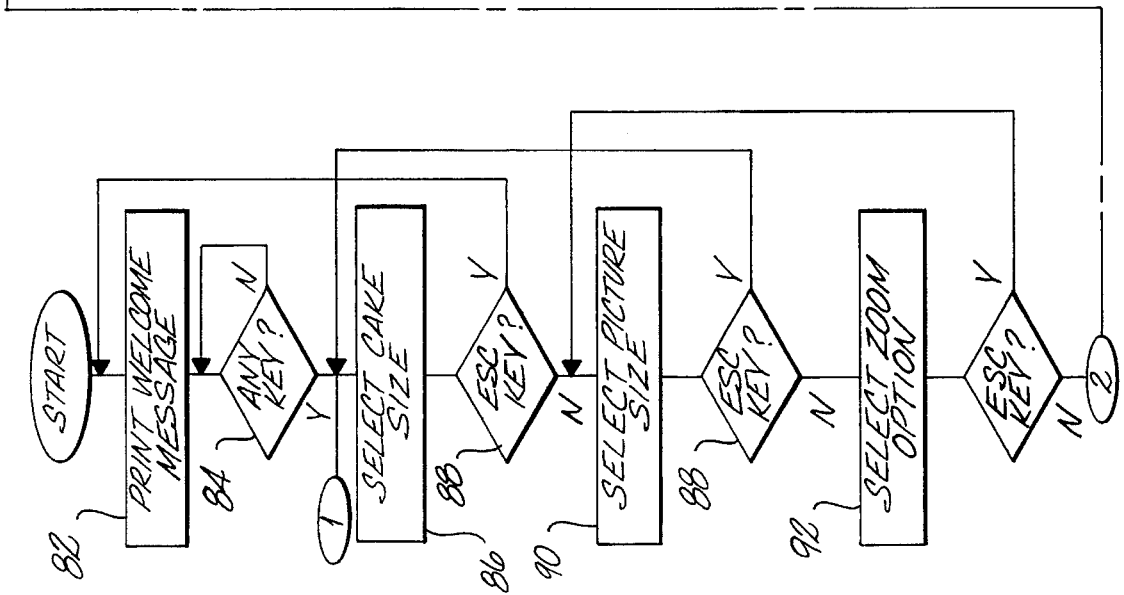
Fig. 8

CAKE DECORATING SYSTEM

BACKGROUND OF THE INVENTION

1. Field of the Invention

The present invention relates generally to automated decoration of cakes, cookies, pastries or other foodstuffs based on an existing photograph, drawing or other art work. More specifically, the invention provides an integrated system employing a scanner for inputting the desired art work, an operator interface incorporating a display and control entry system, a high accuracy, high definition imaging head having a colorant dispensing cartridge and two axis motion and positioning for the colorant dispensing cartridge.

2. Prior Art

Decorated cakes and foodstuffs have long been a popular commercial item for bakeries. Birthday parties, anniversaries, special holiday occasions and weddings are typically occasions celebrated with highly decorated cakes or pastries. Until recently, the majority of cake decorating has been accomplished by hand application of colored frostings by skilled bakery artisans. This process is time consuming and labor intensive. Further, only trained personnel can accomplish the cake decorating tasks.

Recently, automated systems for cake decoration have appeared on the market which allow basic lettering and crude shape decorating on an automated basis. These systems provide some cost savings for bakeries and their patrons, however, detailed decorating is not provided by these systems. More sophisticated systems, such as those disclosed in U.S. Pat. No. 4,910,661 to Barth et al., provide greater flexibility in decoration. However, these systems are complex, require significant bulky and expensive componentry for operation such as video cameras, computer systems and video terminals and typically require operator training to employ the full capabilities of the system.

Automated application of colorant to the surface of a cake or other pastry requires special system considerations due to the uneven surfaces and textures present on the majority of these food articles. Application of high definition coloring simulating photographs or other art work has not previously been achievable.

It is therefore desirable for a cake decorating system to provide ease of use by patrons of a bakery directly or bakery personnel without significant training and employing a system which is compact and eliminates extraneous bulky and complex componentry. It is further desirable that such a system provide high definition imaging transfer to the surface of the foodstuff being decorated. The present invention overcomes the shortcomings of the prior art in providing a cake decorating system meeting these requirements.

SUMMARY OF THE INVENTION

The present invention provides a self contained cake decorating system employing a horizontal work surface with an integrated flatbed scanner disposed in a first portion of the work surface, an operator interface incorporating a menu display and selection system integrally disposed in a second portion of the work surface and a cake decorating station employing alignment guides for positioning the cake to be decorated on the work surface. A color cartridge employing multicolor edible dyes expelled on command through multiple orifices in a nozzle plate is carried by a multi-axis positioning system having a travelling arm extending over the work surface.

An integrated control system provides menu outputs to the operator display and receives operator input for command selection on cake size, scanned image size, and enlargement/reduction of the scanned image size for application to the cake surface. The control system controls and retrieves the scanned image and controls motion of the cartridge positioning system and ejection of colorant by the cartridge to reproduce the scanned image on the cake surface.

The integrated work surface with scanner, operator interface and the colorant application system including the cartridge and positioning mechanism is carried on a wheel mounted support frame for easy positioning and portability.

BRIEF DESCRIPTION OF THE DRAWINGS

The details of the present invention are more clearly understood with reference to the following drawings and detailed description.

FIG. 8 is a flow chart describing operation of the control system.

DETAILED DESCRIPTION

Figure 1:
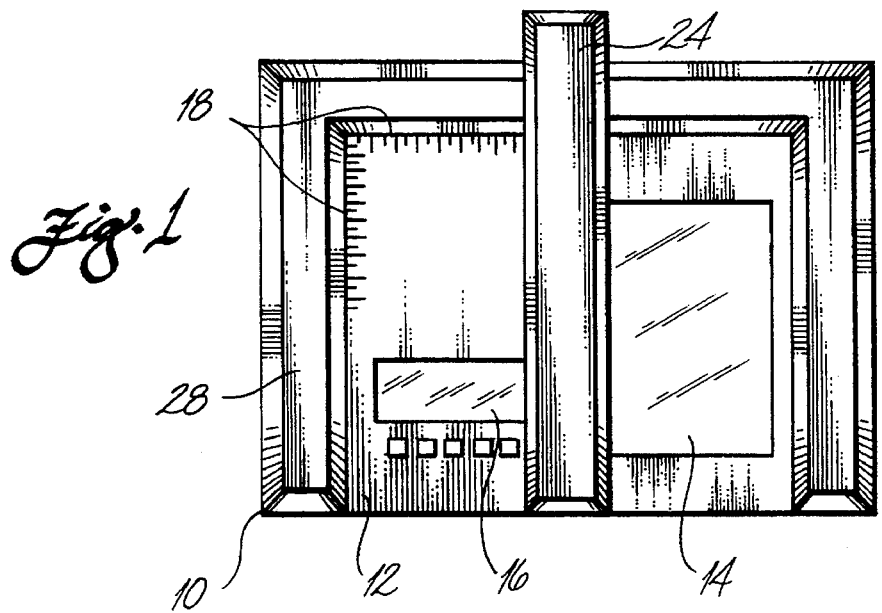
FIG. 1 is a top view of the cake decorating system showing the work surface with integrated scanner, operator interface, cake alignment guides and cartridge support arm.

The basic elements of the cake decorating system are shown in FIG. 1. The cake decorating system 10 incorporates a work surface 12. A flatbed scanner 14 is incorporated into the work surface. An operator interface 16 employing a display and entry keys, to be explained in greater detail subsequently, is also incorporated into the work surface.

The scanner in the present embodiment comprises a flatbed color image scanner which is incorporated in a flush mount into the work surface. As shown in FIG. 1, a first portion of the work surface is dedicated to the scanner at an opposite corner of the work surface from the guides available for positioning the cake or other workpiece. This arrangement allows placement of a photograph or other art work in the scanner and a cake to be decorated to be located on the guides for contemporaneous scanning and printing of the image.

The operator station incorporating the display and keypad is incorporated in a portion of the work surface displaced from the scanner and guides whereby menus presented on the display may be read with the photograph on the scanner and cake in place on the work surface if desired.

Perpendicular guides 18 are inscribed on or attached to the work surface to provide a reference for positioning the cake, pastry, cookie, or other food article to be decorated on the work surface.

Figure 2:
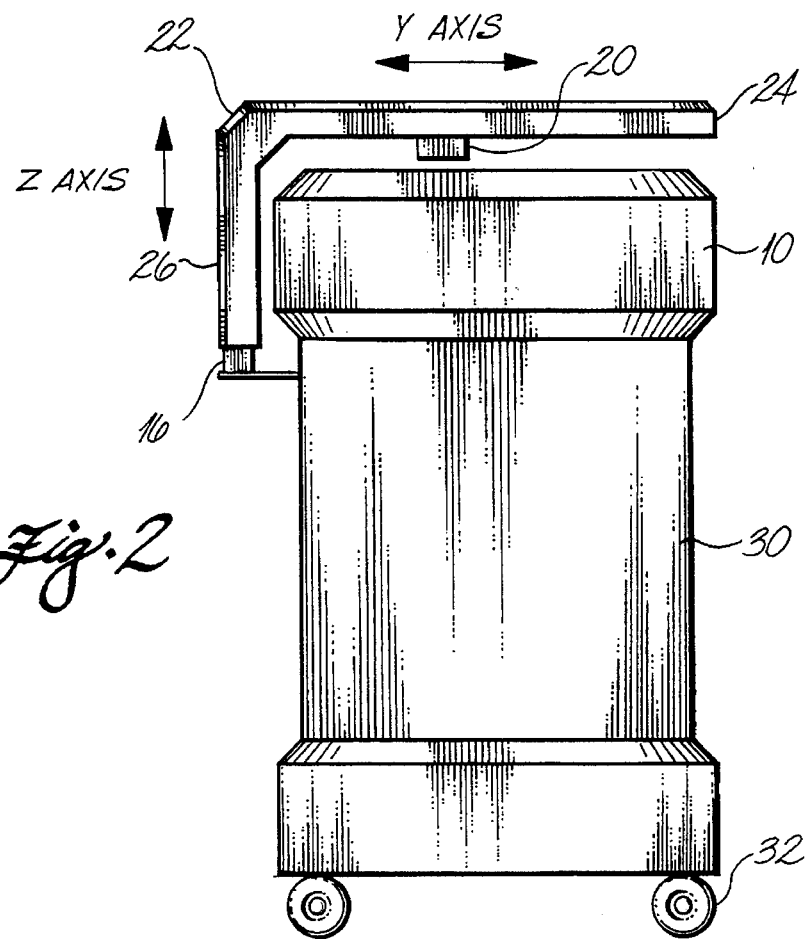
FIG. 2 is a side view of the cake decorating system showing the cartridge carrying travelling arm and motion system arrangement.

As best seen in FIG. 2, a colorant cartridge 20 is carried over the work surface by a motion system 22 having a travelling arm 24 to support the color cartridge over the work surface and provide one axis of motion for the color cartridge and a vertical stanchion 26 supporting the travelling arm. The vertical stanchion is carried on a bearing block riding on a slide attached to the structure of the cake decorating system for motion in the second axis as will be described in greater detail subsequently. In the embodiment shown, the travelling arm position on the vertical stanchion is adjustable for positioning of the color cartridge height over the work surface for a third axis of motion.

Figure 3:
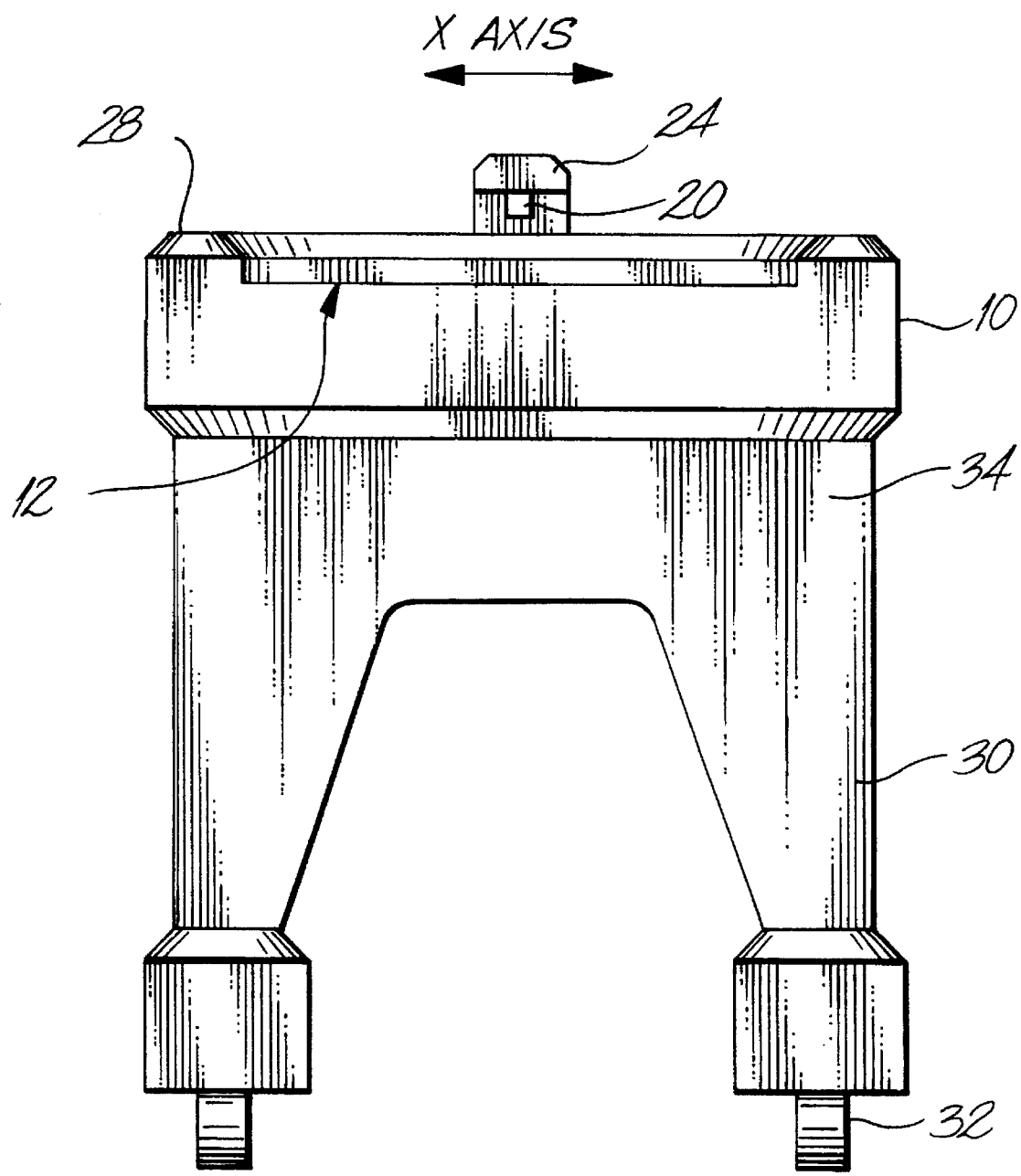
FIG. 3 is a front view of the cake decorating system showing relative positioning of the color cartridge and travelling arm with the work surface.

In the embodiment shown in the drawings, the work surface is surrounded on three sides by raised bumper elements 28 which provide some protection for the work surface and the components incorporated therein and precludes inadvertently pushing a cake or other item to be decorated off the back or sides of the work surface as best seen in FIG. 3. The embodiment shown in the drawings incorporates a support structure having side legs 30 with casters or wheels 32 for easy mobility of the unit. The body 34 of the unit provides a closed case for the control system and components of the scanner and operator station extending below the work surface.

Figure 4:
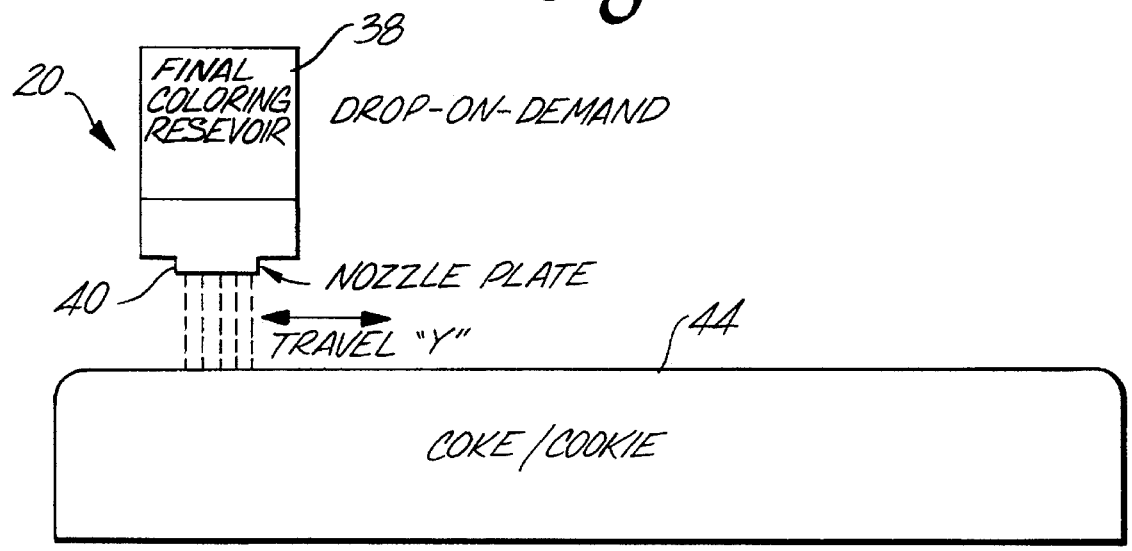
FIG. 4 is a front view of the colorant cartridge demonstrating relative positioning to the cake being decorated.
Figure 5:
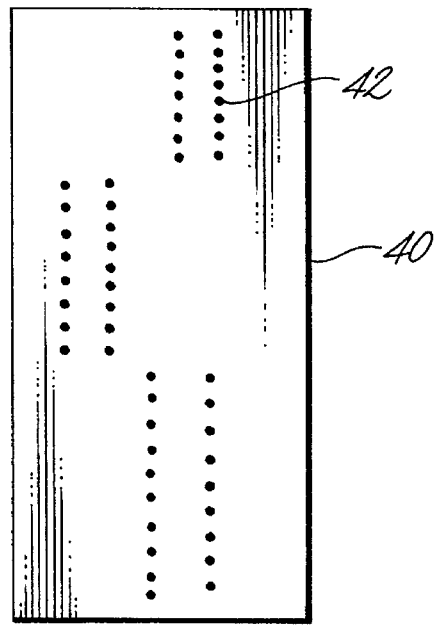
FIG. 5 is a bottom view of the nozzle plate of the colorant cartridge.

The color cartridge employed in the present embodiment of the invention is shown schematically in FIG. 4. A drop-on-demand colorant expulsion system 36 employs food coloring reservoirs 38 for three colors (red, blue and yellow) which are ejected through a nozzle plate 40 onto the cake 44. Details of the nozzle plate are shown in FIG. 5.

The nozzle plate comprises three groups of orifices 42, each group containing 16 orifices for expulsion of colorant. The orifices in each group are contained in two columns of eight separated by approximately 0.025 inch and spaced over a 0.050 inch lateral extent. The orifices in each column are offset by one half the orifice spacing to allow more complete colorant coverage. The drop-on-demand expulsion system employed in the present embodiment incorporates components common with the Hewlett Packard 500C Desk Jet Color Printer. As shown in FIG. 4, the color cartridge is positioned between 0.005 inches to 0.75 inches above the surface of the article being decorated.

The drop on demand colorant expulsion system as described allows one pass, three color printing on the article being decorated. Resolution of 0.006 to 0.008 inches is available with this system. Employing a dithering pattern centerline of the colorant drops can approach 0.003 inch separation.

An alternative embodiment of the present invention employs piezo electric expulsion tubes for providing colorant.

Figure 6:
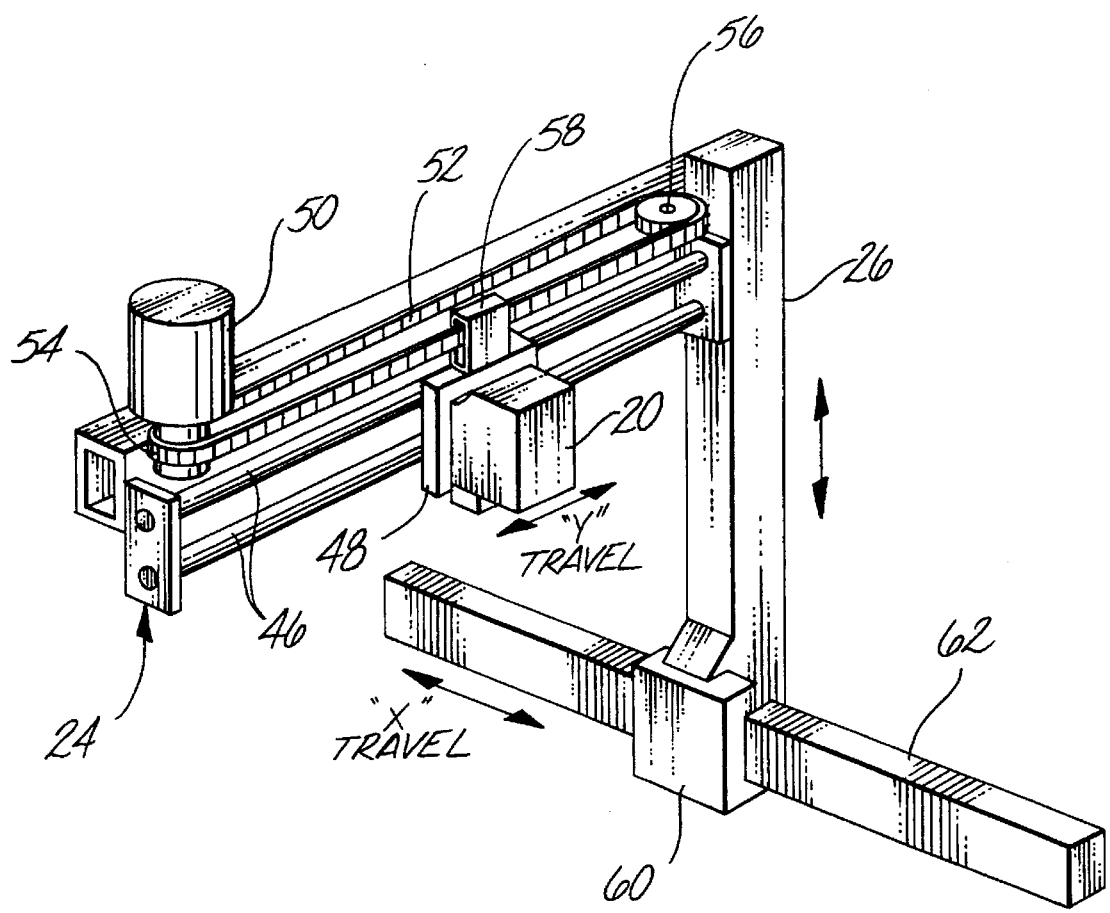
FIG. 6 is a detailed pictorial view of the colorant cartridge travelling arm and motion system.

As best seen in FIG. 6, the arm supporting the color cartridge incorporates two parallel guideway slides 46 on which a first bearing block 48 rides. The bearing block in turn supports the color cartridge. The parallel guides produce rigid orientation of the color cartridge transverse to the "Y" axis of travel provided by the dual slides. A first drive motor 50 is employed for positioning the color cartridge in the "Y" axis. In the embodiment shown in the drawings, a cog belt 52 riding on a drive pulley 54 on the motor and idler pulley 56 distal the motor on the support arm, is attached to the slide block by connector 58. Forward and reverse drive of the first drive motor allows positioning of the color cartridge at any desired location on the slide bars.

The support arm is carried by the vertical support stanchion 26. In the embodiment shown in the drawings, the support arm is movably positionable on the vertical support stanchion to allow adjustment of the color cartridge height over the cake or other item being decorated. The vertical support stanchion is in turn carried by a bearing block 60 which rides on a precision slide assembly 62 for motion along an "X" axis relative to the work surface. A second drive motor with cog belt and pulley system, or precision direct drive stepper motor attached to the bearing block and engaging a gear rack on the precision slide (not shown) is employed for positioning of the bearing block in the "X" axis. The precision slide assembly is mounted to the structure of the decorating unit adjacent the work surface as best shown in FIG. 2.

In the present embodiment, control of vertical positioning of the support arm incorporates a motor system (not shown) similar to that described for the "X" and "Y" axis positioning of the color cartridge. A proximity sensing means is employed to enable automatic height adjustment to maintain optimum imaging head to target surface standoff for work piece heights from 0 to 15 centimeters (0 to 6 inches). The "Z" axis servo system is capable of maintaining standoff spacing within 1 millimeter tolerance over target surface slopes up to 15 degrees at maximum slew rates for the X/Y motion of the positioning system for the color cartridge.

Figure 7:
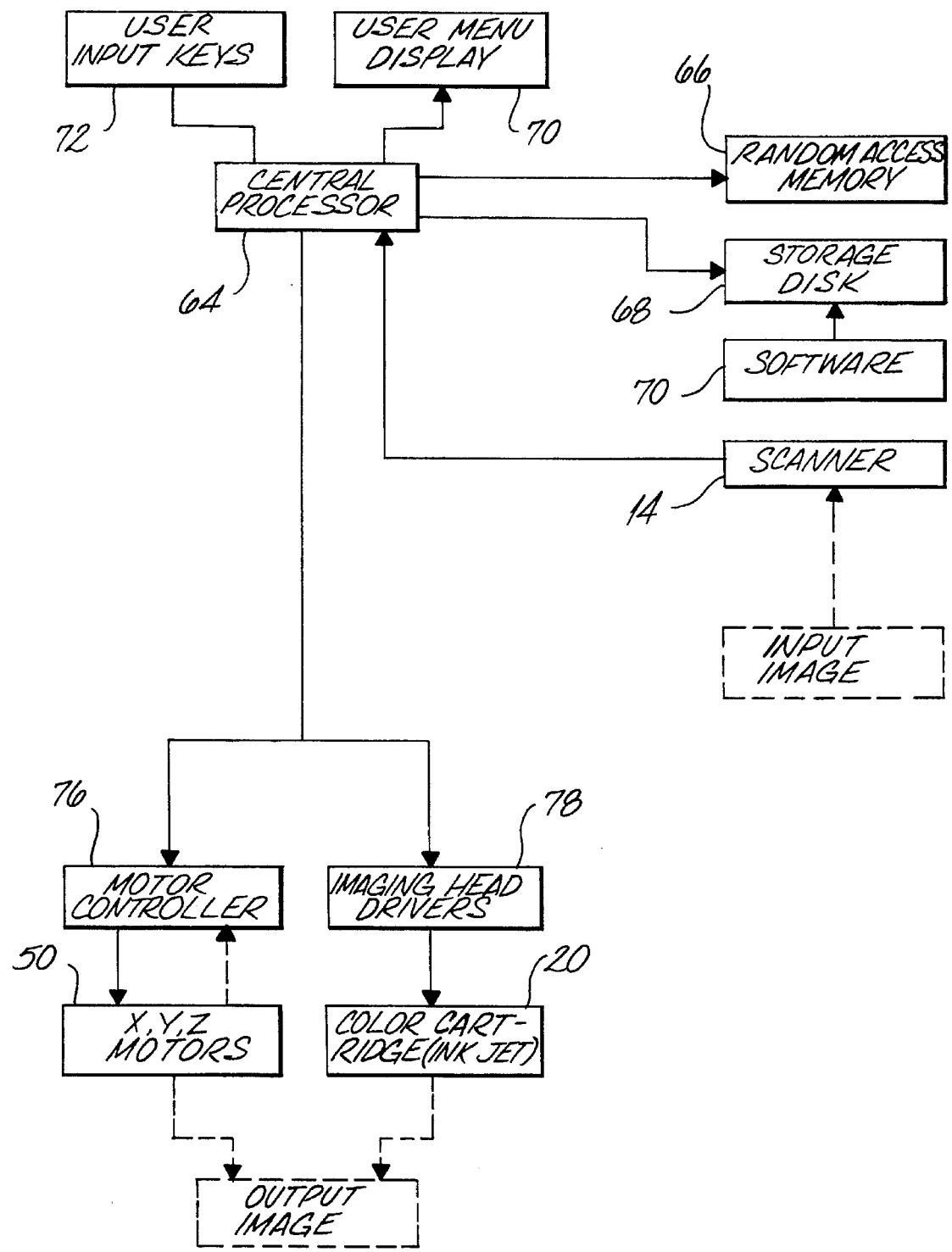
FIG. 7 is a block diagram of the control system and its relationship to the other components of the cake decorating system.

The control system of the present invention is shown in block diagram form in FIG. 7. Process control is provided by a central processor 64 which in the present embodiment comprises an Intel 80486 microprocessor. Data storage in the form of a random access memory 66 and storage disk 68 are connected to the central processor. Software for the system, generally designated 70, will be described in greater detail subsequently. The central processor provides menu prompts for operation of the system on the user menu display 70 which comprises a portion of the operator interface 16 previously discussed with regard to FIG. 1. User input keys 72 provide input to the central processor based on the operations desired by the user in response to the menu displays. The scanner 14 provides data of the image to be produced to the central processor which stores the image in memory or on disk as a monochrome or polychrome pixel map.

Production of the image by the decorating system on the cake or other work piece, is accomplished through control of the central processor of a motor controller 76 and imaging head drivers 78. The motor controller provides servo control for positioning of the color cartridge over the work surface. In the embodiment of the present invention, the motor controller provides incremental step pitch of no greater than 0.1 millimeters (0.004 inches). Feedback control in the servo system allows absolute positioning accuracy with respect to the pixel map.

The motor controller provides position and rate signals to the "X," "Y" and "Z" axis motors (generally designated 50 in FIG. 7).

In addition, the central processor controls colorant expulsion through imaging head drivers 78 which in turn control the color cartridge 20 previously described. Control of positioning and colorant expulsion creates the output image on the surface of the cake or other work piece.

Figure 9A:
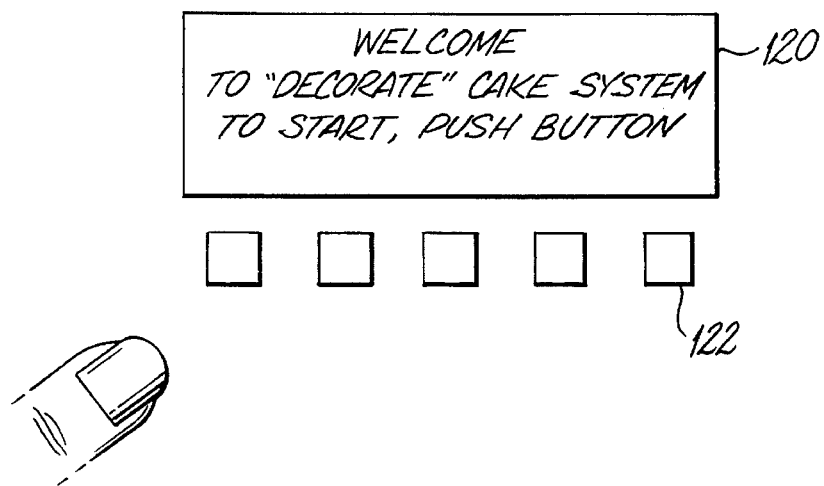
FIG. 9A–C are exemplary menu displays employed on the operator interface.

Operation of the software in the system is generally shown in FIG. 8. Upon initiation of the system in block 80, the central processor causes a welcome message to be printed to the display in block 82. An exemplary form of the welcome message is shown in FIG. 9A which provides a representation of the operator interface display screen and input key pad. In the present embodiment of the invention, the display comprises an LCD multiline display and the input key pad incorporates five capacitive switches activated by operator contact with a finger. Alternative embodiments of the invention employ a "touch screen" system incorporating the "key pad" within the LCD display itself.

Figure 9B:
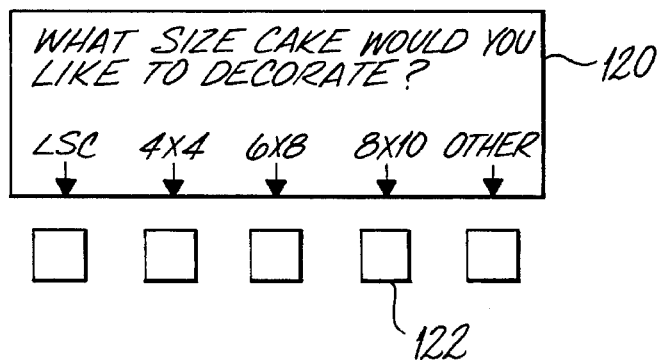
Figure 9C:
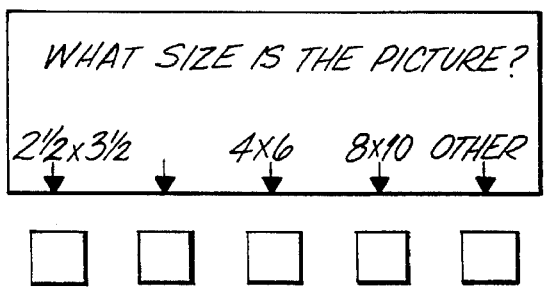

The controller awaits contact with any key by the operator in block 84. Upon key contact, a "select cake size" display is provided, block 86, which is represented in FIG. 9B. A question is provided on the LCD display to the operator "what size cake would you like to decorate" and options, including "4×4 inches," "6×8 inches," "8×10 inches" and "other" are provided adjacent the key pad switches. Selection of the desired size by the operator is input to the central processor. In the embodiment shown, selection of the "other" key by the operator prompts a secondary menu with additional sizes for the cake or workpiece for example, "16×24 inches," "3 inch cupcake," "8 inch round" and "other." Those skilled in the art will recognize that nesting of additional options based on the "other" key may be provided to any desired level.

An escape key is provided to allow return to the prior menu at any time. Operation of the escape key is represented in blocks 88. Operator contact with a cake size key results in storage of the size selection by the central processor. The central processor then provides a prompt on the display screen for selection of size of the input picture, block 90, which will be placed by the operator on the scanner. Selection of picture size is accomplished through a plurality of menus as previously described for selection of cake size. Upon selection of picture size, the central processor then provides a menu for the operator to select a "zoom option," block 92, for enlargement or reduction of the scanned picture size to the cake size. Selections for percentage enlargement or percentage reduction of 25%, 50%, 100%, 200% as exemplary values are provided to the operator for selection.

Upon completion of the selection, the controller will provide a menu instruction to the operator verifying selection of the cake size, input picture size and zoom reduction and instructions to place the picture in the scanner and the cake or work piece on the work surface aligned with the guides, block 94, followed by instructions to select "start" or "cancel" on designated input keys. Upon selection by the operator of the cancel or start key, block 96, the central processor will return to cake size selection (based on selection of cancel by the operator) or begin the scanning and printing process, block 98. The central processor controls the printing of the image on the cake or other work piece as previously described and monitors for completion of the printing process, block 100. Upon completion of the printing process, a message to the operator is printed on the display, block 102, designating a completed process and offering the option of printing another cake. Selection of the additional print option, block 104, returns the process to block 94 for printing of an additional cake using the processes previously described.

The present embodiment of the system senses key presses during the printing process and upon sensing a key press, block 106, determines if the cancel key has been pressed during the printing process. If the cancel key has in fact been pressed, block 108, the system resets the scanner and printer, block 110, and returns to the select cake size selection of block 86.

Having now described the invention in detail as required by the patent statutes, those skilled in the art will recognize modifications and substitutions to the elements of the invention as disclosed to accommodate specific applications or embodiments. Such modifications and substitutions are within the scope and intent of the invention as defined by the following claims.

What is claimed is:

1. A self contained automatic cake or food decorating system comprising:

a single integrated horizontal work surface;

workpiece positioning guides integral to a first portion of the work surface for positioning a cake or other food article to be decorated;

a flatbed scanner integral with a second portion of the work surface displaced from said first portion;

an operator interface, incorporating a display for menu instructions and input means for operator response to said instructions, integral with a third portion of the work surface;

a multi-axis motion system carrying a color cartridge disposed over said work surface, said color cartridge comprising a drop-on-demand colorant expulsion system having a plurality of orifices receiving edible colorant from at least three reservoirs of different colorant, said plurality of orifices arranged in at least two offset columns; and integral control means providing the menu instructions to the operator display and receiving signals from the input means, said control means further receiving input from the scanner and controlling the motion system and color cartridge to reproduce a photographic quality image on the cake or food article from the scanner responsive to the signal inputs from the operator interface.

2. A self contained automatic cake or food article decorating system as defined in claim 1 wherein the motion system comprises:

a travelling arm extending horizontally over the work surface and incorporating first axis positioning means supporting the color cartridge, said first axis positioning means extending longitudinally along the arm; and a vertical support stanchion supporting the arm and attached to a second axis positioning means, said second axis positioning means adjacent one edge of the work surface, operation of the first axis positioning means and second axis positioning means being controlled by the control means which allows positioning of the color cartridge over any location in the first portion of the work surface.

3. A self contained automatic cake or food article decorating system as defined in claim 2 wherein the arm carrying the first axis positioning means is movably attached to the vertical support stanchion through a third positioning means, said third positioning means adjusting elevation of the arm over the work surface.

4. A self contained automatic cake or food article decorating system as defined in claim 3 wherein the third positioning means includes a proximity sensor for determining height of the color cartridge over a cake or food article placed on the work surface, said third positioning means responsive to the proximity sensor for positioning the arm vertically.

5. A self contained automatic cake or food article decorating system as defined in claim 2 wherein the control means comprises:

a central processor which converts a photographic image from the scanner to a pixel map;

a motor controller responsive to the central processor and providing incremental step pitch control to the first and second axis positioning means for positioning the color cartridge; and imaging head drivers responsive to the central processor for controlling colorant expulsion corresponding to the pixel map.

6. A self-contained automatic cake or food article decorating system as defined in claim 1 wherein said workpiece positioning guides comprise raised bumper elements extending from at least two edges of the first portion of the work surface for restraining a cake or food article placed on the work surface.

7. A self contained automatic cake or food article decorating system as defined in claim 1 wherein the plurality of orifices in the color cartridge are arranged in three pairs of offset columns, each pair of columns displaced from each other pair in at least one axis thereby enhancing single pass multi-color coverage of the cake or food article.

* * * * *